United States Patent [19]

Jensen

[11] Patent Number: 4,703,626
[45] Date of Patent: Nov. 3, 1987

[54] OCEAN THERMAL ENERGY CONVERSION HYDRO WELL APPARATUS

[76] Inventor: Robert K. Jensen, 14990 Echo Dr., Golden, Colo. 80401

[21] Appl. No.: 2,640

[22] Filed: Jan. 12, 1987

[51] Int. Cl.$^4$ .............................................. F03G 7/04
[52] U.S. Cl. ................................................... 60/641.7
[58] Field of Search ............................ 60/641.6, 641.7

[56] References Cited

U.S. PATENT DOCUMENTS

| | | | |
|---|---|---|---|
| 2,006,985 | 6/1934 | Claude | 60/641 |
| 4,278,405 | 7/1981 | Angle | 417/150 |
| 4,311,012 | 1/1982 | Finley | 60/641.7 |
| 4,355,513 | 10/1982 | Girden | 60/641.7 |
| 4,597,360 | 7/1986 | Johnson | 119/3 |

Primary Examiner—Allen M. Ostrager

[57] ABSTRACT

An apparatus is disclosed to generate electricity using ocean thermal and salinity gradients. An elongated chamber extends vertically downward from the surface of the ocean. Warm, high-salinity water from the ocean surface flowing by gravity down the apparatus is used to drive a turbine and electrical generator. Air bubbles are introduced into the flow at the upper opening of the apparatus. This air is subject to hydraulic compression as the water falls. The flow of sea water and air passes through a cooling tube near the bottom of the apparatus where it is cooled to the temperature of ambient sea water at that depth. The flow then enters a chamber where the air and water are allowed to separate. Because of its greater density than the ambient sea water at that depth, the water in the chamber tends to flow out exhaust ports located at the bottom of the chamber. Excess air pressure held in the chamber can either be used to operate a booster pump to increase the flow through the turbine, or to assist in exhausting water from the separation chamber.

5 Claims, 1 Drawing Figure

OCEAN THERMAL ENERGY CONVERSION HYDRO WELL APPARATUS

FIELD OF THE INVENTION

The present invention relates generally to the use of ocean salinity and thermal gradients to generate electricity. In particular, the present invention uses these gradients to induce a flow of sea water and entrained air through a vertical chamber to power an electrical generator.

BACKGROUND OF THE INVENTION

In most oceanic locations around the world the water at depths greater than 130 meters is relatively fresh, dark, and cold in comparison with the surface water, which is warmer and has a greater salinity. Various ocean thermal energy conversion (OTEC) inventions have been devised in the past to exploit these temperature and salinity gradients between the surface and deep ocean to produce power, or to create an upwelling of nutrient-rich deep water to the ocean surface for mariculture. For example, one simple method involves placement of a long vertical cold water pipe into the ocean in such a manner that the bottom of the pipe is exposed to cold, relatively fresh water, while the top of the pipe is in warm, saline water. A continuous flow of water up the pipe results after the fountain is primed, due to an exchange of heat, but not salinity, with the ambient ocean. H. Stommel, A. B. Arons, and D. Blanchard, "An Oceanographical Curiosity; the Perpetual Salt Fountain," *Deep Sea Research*, Vol. 3 (1955), pp. 152-155. A similar system for surface water-deep water counterflow is disclosed by Johnson, "Salinity-Driven Oceanographic Upwelling," U.S. Pat. No. 4,597,360, issued July 1, 1986.

A basic OTEC system for generation of power is disclosed by Claude, et al, "Method and Apparatus for Obtaining Power from Sea Water," U.S. Pat. No. 2,006,985, issued July 2, 1935. OTEC systems of this type have considerable appeal in that approximately sixty percent of the world's largest cities and two-thirds of the world's population live within 80 kilometers of the sea. However, existing OTEC systems have either been inefficient or not cost-effective due to a number of problems, such as the length of the large cold water pipe required; the size of heat exchangers, turbines, and evaporators; biofouling, corrosion, and creation of salt water gases; and the difficulty of transmitting electricity under water.

In contrast, in the present invention, hydraulic compression of the entrained air is used to assist in exhausting water at the bottom of the apparatus, thus increasing the flow through the generator. The present apparatus does not require extreme temperature differences, and thus can be located close to shorelines near most major cities. This serves to minimize the length of electrical transmission lines. The present invention does not involve cold water pipes, evaporators, condensers, or steam turbines. The heat exchanger is an inexpensive cooling tube which serves to limit biofouling and corrosion.

SUMMARY OF THE INVENTION

The present invention uses ocean salinity and thermal gradients to induce a flow of sea water and entrained air through a vertical chamber to power an electrical generator. Sea water flows into an intake manifold located at the upper end of the vertical chamber. Air is added to the saline water at the intake manifold in the form of small bubbles by an air induction vortex. The air is trapped in the falling water and compressed as it is pulled downward by gravity through a penstock. The flow of water and entrained air is used to drive a turbine and electrical generator to create electricity. The water and air are then cooled as they flow through a cooling tube which spirals down and around the outside of the vertical chamber. The flow then passes over a separating cone in a chamber located at the bottom of the apparatus. The trapped compressed air separates and rises into the upper portion of this chamber. The cooled, high-salinity water tends to flow out a number of exhaust ports at the bottom of this chamber because it is denser than the surrounding sea water. The pressure of the compressed air in the chamber can be regulated to maintain a stable level of water in the chamber. In addition, the compressed air in the chamber can be used to drive a booster pump to increase the flow of water through the turbine, or to create a stream of air bubbles to increase the flow of water out of the chamber through an upwelling tube, if necessary.

BRIEF DESCRIPTION OF THE DRAWINGS

The FIGURE is a schematic diagram showing a vertical cross-section of the apparatus. The view is broken for convenience due to the extended overall length of the apparatus.

DETAILED DESCRIPTION OF THE INVENTION

Figure 1:
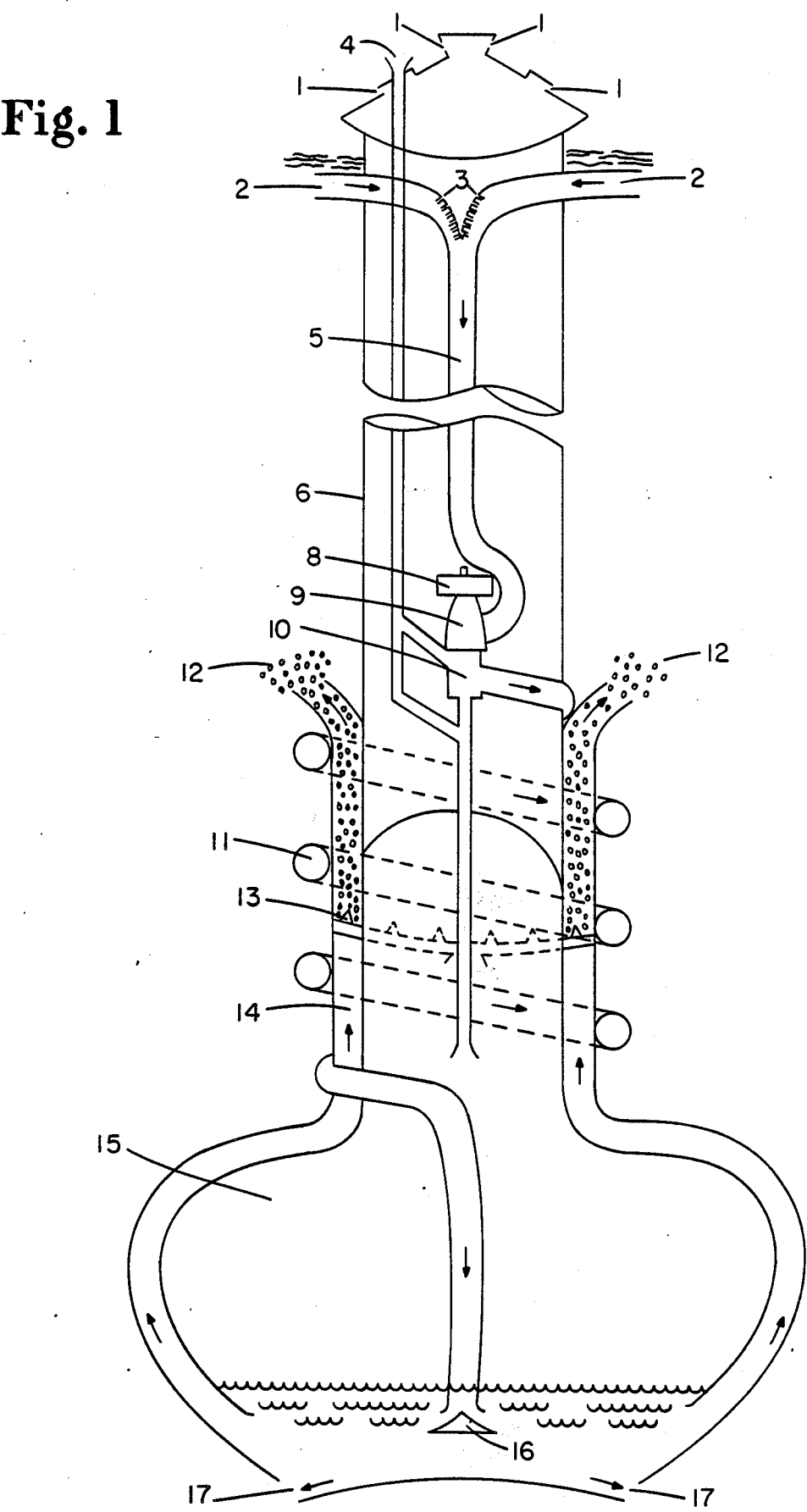

A generally cylindrical casing 6 housing the apparatus extends vertically from the surface down into the ocean. A depth of 400 feet may be used as an average length for the apparatus based on other hydroelectric plants. The apparatus may be held in place by moorings attached to the ocean bottom. Past research suggests that concrete or polyvinyl chloride may be the most cost-effective materials for the apparatus. A cone-shaped top extends from the upper end of the cylindrical casing, above the high tide and wave limits, to afford easy access to the equipment located inside the casing for servicing. Open-grate platforms located inside the casing add strength and support equipment where needed. The optimal diameter of the cylindrical casing and the water intakes 2 are determined by tide, current, and wave conditions. In particular, the screened water intakes 2 must not remove warm surface water faster than it is available. One alternative would be to construct a series of smaller apparatuses grouped around a central platform where one crane could service the entire group.

Prior to commencing operation of the apparatus, the separation chamber 15 must be pressurized with air before water is allowed to enter the water intakes 2. In addition, the upwelling tube 14 must be primed to create an upward flow of water. Operation of the apparatus is commenced by allowing water to enter the water intake 2. The water is then drawn by gravity through the penstock 5 to drive the turbine 9 and electrical generator 8.

Air flows through the air intakes 1, and is added to the flow of surface water in the form of small bubbles by the Venturi effect at the air induction vortex 3. The amount of air entering the vortex is regulated to equal the amount of air being exhausted from the apparatus.

Only as much air is entrained as necessary to stabilize the water level in the separation chamber 15. When the booster pump 10 is running, the air induction vortex allows the maximum amount of air to be entrained. The air trapped in the falling water is compressed as it is pulled downward by gravity through the penstock. The penstock below the turbine has an increased diameter to avoid back pressure in the turbine. The flow of water and air then enters the cooling tube 11 which spirals down and around the outside of the separation chamber 15. Heat flows from the warmer water and air in the cooling tube to the ambient ocean water, and to the water flowing upward through the upwelling tube 14 located between the cooling tube and the outside surface of the separation chamber 15. The flow of water and air then enters the separation chamber 15 over a separating cone 16. The compressed air in this flow then separates, rises, and pressurizes the separation chamber 15. This air has been compressed to the same pressure as the ocean depth pressure opposite the separating cone 16. The water in the separation chamber is essentially at the same temperature as the ocean at that depth, only denser because of its higher salt content. This water flows out of the lower exhaust manifold 17 because it is denser than the ambient sea water at that depth.

The upwelling tube 14 is also used to remove water from the separation chamber. When the salinity and temperature gradients are sufficiently large, most of the water in the separation chamber will flow out the lower exhaust ports 17, with only a minimal flow through the upwelling tube. Due to heat exchange between the cooling tube 11 and the upwelling tube 14, the flow of water upward through the upwelling tube is gradually warmed, resulting in a thermosiphoning effect. The flow through the upwelling tube can be accelerated by releasing a jet of air bubbles through orifices 13 in the upwelling tube, using a portion of the compressed air held in the separation chamber. Varying the rate of flow in the upwelling tube provides another means of controlling the air pressure and water level in the separation chamber. This exhaust system would not be used during normal operating conditions. However, should the flow through the lower exhaust ports 17 or the upwelling tube 14 slow, pressure would build within the separating chamber 15, triggering activation of the valves controlling the jet of air bubbles in the upwelling tube.

Excess compressed air held in the separation chamber can also be used to drive a booster pump 10 to increase the flow of sea water and air down the penstock 5 and through the turbine 9. Air exhausted by the booster pump, as well as any excess compressed air vented from the separation chamber are released to the atmosphere through the air exhaust tube 4.

It will be apparent to those skilled in the art that many variations and modifications of the present invention may be made without departing from the spirit and scope of the invention.

I claim:

1. An ocean thermal energy conversion apparatus comprising:
   (a) A vertical chamber extending downward into the ocean with its upper end near the surface of the ocean;
   (b) Air induction means suitable for introducing a stream of air bubbles into the sea water falling down the vertical chamber;
   (c) A generator means located at the lower end of the vertical chamber, to generate electricity from the flow of sea water and air flowing down the vertical chamber;
   (d) Heat exchanger means to cool the flow of sea water and air to the temperature of ambient sea water at the lower end of the apparatus;
   (e) A chamber located at the lower end of the apparatus for separating the air from the flow of sea water; and
   (f) A number of exhaust ports in the separation chamber to allow water to flow out of the separation chamber into the surrounding ocean.

2. The apparatus of claim 1, further comprising:
   (a) An upwelling tube extending upward from the bottom portion of the separation chamber, in thermal contact with the heat exchanger means; and
   (b) A number of orifices to allow streams of air bubbles to be introduced into the upwelling tube from the separation chamber, to increase the flow of water through said upwelling tube.

3. The apparatus of claim 1, wherein the separation chamber further comprises:
   A separation cone located in the separation chamber below the outlet of the heat exchanger means, to separate the entrained air from the flow of sea water.

4. The apparatus of claim 1, further comprising:
   A booster pump driven by the compressed air held in the separation chamber and used to increase the flow of sea water and air through the generator means.

5. The apparatus of claim 1, wherein the flow of air through the air induction means can be modulated to maintain a desired water level in the separation chamber.

* * * * *